UNITED STATES PATENT OFFICE 2,245,600

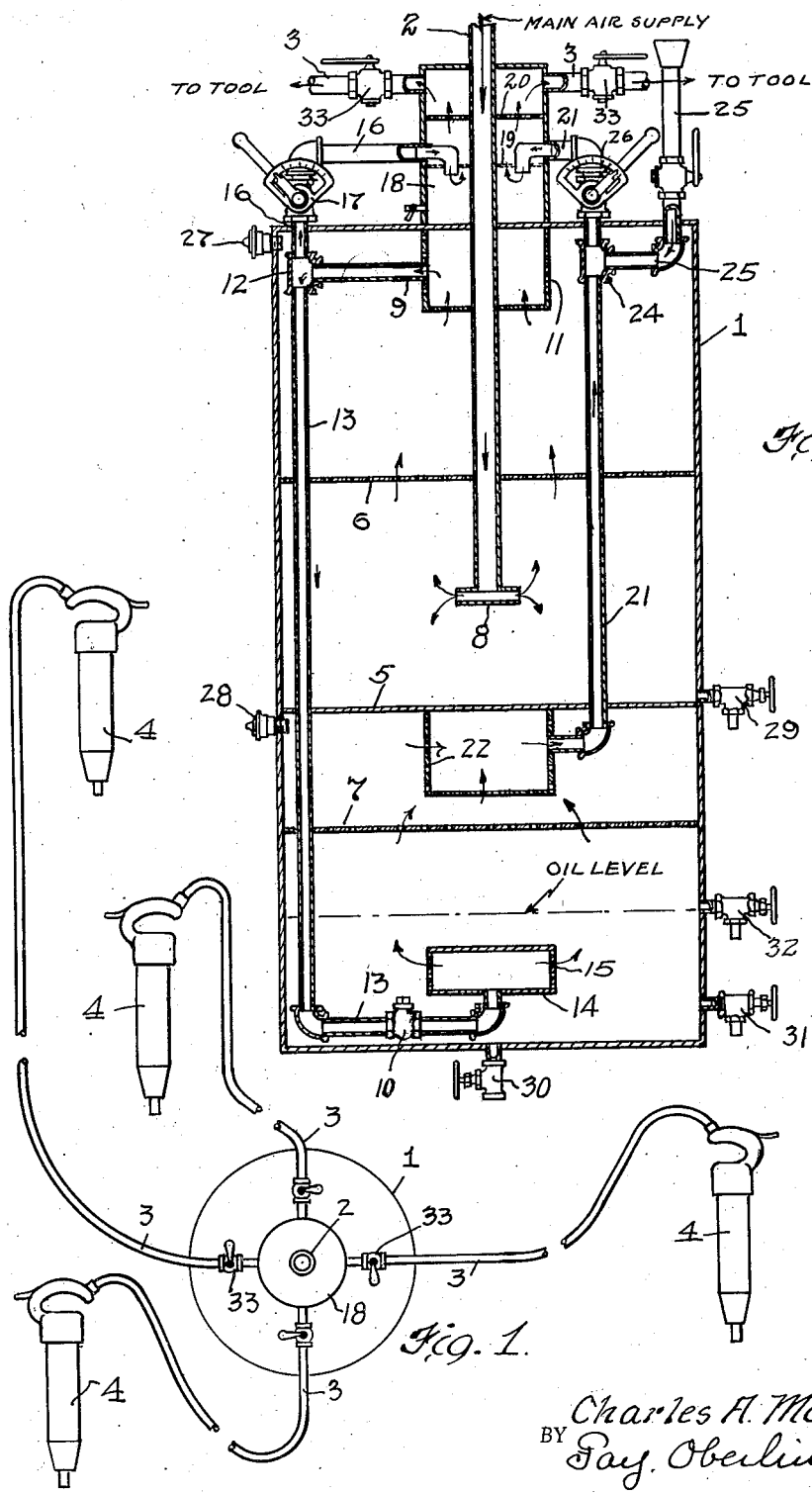

APPARATUS FOR LUBRICATING PNEUMATIC TOOLS

Charles A. Medsker, Cleveland Heights, Ohio, assignor to William L. Ulmer, Cleveland, Ohio Application May 6, 1938, Serial No. 206,414

11 Claims. (Cl. 184—55.)

The present invention relates to a novel method for lubricating pneumatic tools such as air hammers, riveters, rock drills, welding machines and similar power tools utilizing air pressure as their source of power. The invention also includes apparatus particularly adapted for the performance of such method.

Heretofore such pneumatic tools have been lubricated by three different methods; first, by disassembly of the parts of the tool, bathing them in oil or lubricant and then reassembling; second, by means of a self-contained lubricant reservoir or grease cup mounted upon the tool itself; and third, by means of introducing oil or lubricant in liquid form into the air supply line, such as by an oil drip feeder. The first two such prior lubricant places have proven difficult in that they not only require additional time and labor for the application of the lubricant, but such lubrication has been of an intermittent nature so that although the tools might be adequately and perhaps excessively lubricated during a portion of their use, still at other times they were subject to deficient lubrication. The third prior art method has proven disadvantageous in that the oil or lubricant, being delivered in liquid form or drops, tends to form "slugs" which due to the high velocity of the air flow are likely to not only injure the air supply conduits, but also the parts of the tools when such slugs are impacted against them. Such lubricant slugs, in addition, have very often been found to be carried through the pneumatic tool with such velocity and in such form as not to have any lubricating effect at all; i. e., the lubricant slugs are literally "shot through" the tool and emerge therefrom while still in slug form. Furthermore, the drops of liquid lubricant tend to settle out in the air lines and hence such lubricant is not efficiently transmitted to the point where it is desired.

It is the general object and nature of my invention to provide a lubricating method and apparatus which will supply lubricant in a novel form to the parts of a pneumatic tool continuously, efficiently and economically. Briefly outlined, my invention contemplates a process and apparatus for the entrainment of lubricant, such as oil in a finely divided, vaporous or suspended form, having much the appearance of a "fog," in the air pressure supply of the pneumatic tools. The entrainment of the lubricant or "oil fog" in the air supply lines is of further benefit and advantage in that it prevents the formation of rust throughout the interior surfaces of the air lines regardless of the position of the latter. The preservation of life of the supply lines by the elimination of the formation of rust particles and scale which heretofore has proven a serious hazard in pneumatic tool operation is of utmost importance. A lubricant entrained in the air supply lines according to my present process, thoroughly and efficiently contacts the entire inner surface thereof so as to prevent the formation of scale and rust, and does not settle out on the bottom of the lines in the form of liquid deposits or slugs.

To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of various ways in which the principle of the invention may be used.

In said annexed drawing—

Fig. 1 is a more or less diagrammatic view illustrating a pneumatic tool and lubricating system adapted to perform the method of and embodying the principle of my invention; Fig. 2 is a vertical sectional view taken through the lubricant entraining apparatus adapted to perform the method of my invention.

Now referring more particularly to the drawing, there is shown therein a container 1 into which the main air pressure supply line is introduced through the inlet pipe 2. Branch lines 3 lead from the mixing chamber 18 of the container 1 to the individual pneumatic tools 4, which in the particular instance are illustrated as air hammers. As the main air supply passes through the container 1, it entrains a variably regulated amount of lubricant and this lubricant in turn is carried to each one of the pneumatic tools and the parts of the latter are thereby bathed in a film of oil, the amount and supply of which is of course dependent upon the amount of use of the tools. Thus, a lubrication of the tools is of a constant and uniform nature during their operation.

Now referring particularly to Fig. 2, the container 1 has a horizontal dividing wall 5 which separates the interior of the container into an upper moisture and foreign particle eliminating or precipitating compartment and a lower oil entraining compartment. Baffle plates consisting of perforated plates or screens 6 and 7 are located in the upper and lower compartments respectively of the container 1.

The lower end 8 of the inlet pipe 2 is in the form of a T-head whereby the incoming air supply stream is directed laterally of the upper compartment or chamber of the container 1. Excess moisture and foreign particles entrained in the air supply are precipitated and eliminated in this upper chamber, due to the increase in volume or expansion of the air stream and also its change in direction of flow. The perforated plate or screen 6 also performs some filtering action on the air stream.

A pipe or conduit 9 leads from the perforated plate or screen basket 11 in the top of the upper chamber of the container 1. A T-connection 12 connects the conduit 9 to the conduit 13 which leads to the distributing head 14 having the perforated side walls 15. A check valve 10 is located in the conduit 13 to prevent reverse or flow "back up" from the lubricant chamber. The distributing head 14 is located beneath the oil level of the lubricant entraining chamber of the container 1. A conduit 16 also leads from the T-connection 12 and has the flow regulating valve 17. The conduit 16 terminates in the mixing chamber 18 on the top of the container 1. Screens and perforated baffle plates 19 and 20 are located in the interior of the mixing chamber 18 for the purpose of aiding in the turbulent flow and admixture of the air streams flowing into such chamber.

A conduit 21 leads from the perforated cage 22 in the top of the lubricant entraining chamber to the T-connection 24. The branch conduit 25 from the T-connection 24 extends upwardly through the top of the container 1 and constitutes an oil filler pipe. A shut-off valve is of course connected to the conduit 25. The conduit 21 extends through the T-connection 24 to the mixing chamber 18 and also has a flow regulating valve 26 connected in it adjacent the top of the container 1 and where it is accessible for manipulation.

Safety valves 27 and 28 are located in the side wall of the container 1 and in communication with the upper and lower chambers thereof respectively. Drain cocks 29 and 30 are also connected to the bottoms of each one of these two chambers. Oil level indicating cocks 31 and 32 are mounted in the side wall of the container 1 adjacent the lubricant supply and are for the purpose of indicating the oil level therein. Shut-off cocks 33 are connected in each of the branch lines 3 leading from the mixing chamber 18 to the individual pneumatic tools 4.

The operation of the above described apparatus is as follows: The main air supply is introduced through the inlet 2 and through its terminal end 8 where excess moisture and foreign particles are precipitated in the bottom portion of the upper chamber of the container 1. This air supply then follows the direction of the arrows through the conduit 9 and thence the stream is divided to the conduits 13 and 16. That portion of the air stream going through the conduit 13 passes up through the bath of the lubricant or oil in the lower chamber of the container 1, where it entrains particles of lubricant in the form of a "fog" or a vapor, and such lubricant entrained air then enters the mixing chamber 18 in which it joins the remainder of the air stream coming from the conduit 16. These two air streams are then mixed in the mixing chamber 18 and pass out through the branch lines or conduits 3 to the individual pneumatic tools 4.

The pulsating action of the air stream through the lubricant chamber also aids in the formation of the lubricant fog or vapor, since such pulsating action imparts an additional turbulence to the body of the lubricant bath.

The amount and proportion of lubricant entrained in the ultimate air supply delivered to the branch lines 3 is variably regulated by means of the control valves 17 and 26. Thus, if the valve 17 is set at full open position and the valve 26 at closed position, all of the air stream introduced through the inlet 2 of the apparatus will pass out through the conduit 16 and to the branch lines 3, without entrainment of any lubricant. On the other hand, if the valve 17 is completely closed and the valve 26 completely opened, all of the air delivered through the inlet 2 will be passed through the lubricant entraining chamber and delivered out through the conduit 21 and the branch lines 3 to the individual tools 4. Between these last described two positions of regulation of the valves 17 and 26, a variable proportion of the air stream passed through the lubricant entraining chamber can be controlled as desired, so that a greater or lesser amount of lubricant ultimately delivered to the tools is obtainable as the capacity, size, and amount of lubrication of the tools might require.

Other modes of applying the principle of my invention may be employed instead of the one explained, change being made as regards the means herein disclosed, provided those stated by any of the following claims or their equivalent be employed.

I therefore particularly point out and distinctly claim as my invention:

1. A lubricating apparatus for pneumatic tools compriisng a container having a lubricant supply chamber, a main air supply inlet in said container, a conduit in communication with said inlet and leading to said lubricant supply chamber, a plurality of outlets in communication with said inlet, and a second conduit leading from said lubricant supply chamber to the point of communication of said inlet and of said outlets.

2. A lubricating apparatus for pneumatic tools comprising a container having a lubricant supply chamber and a moisture precipitating chamber, a main air supply inlet terminating in said moisture precipitating chamber, a conduit leading from said moisture precipitating chamber to said lubricant supply chamber, a plurality of outlets in communication with said inlet, and a second conduit leading from said lubricant supply chamber to the point of communication of said inlet and of said outlets.

3. A lubricating apparatus for pneumatic tools comprising a container having a lubricant supply chamber, a main air supply inlet in said container, a conduit in communication with said inlet and leading to said lubricant supply chamber, a plurality of outlets in communication with said inlet, a second conduit leading from said lubricant supply chamber to the point of communication of said inlet and of said outlets, and valves for regulating the amount of air flow in both of said conduits.

4. A lubricating apparatus for pneumatic tools comprising a container having a lubricant supply chamber and a moisture precipitating chamber, a main air supply inlet terminating in said moisture precipitating chamber, a conduit leading from said moisture precipitating chamber to said lubricant supply chamber, a plurality of outlets in communication with said inlet, a second conduit leading from said lubricant supply chamber to the point of communication of said inlet and of said outlets, and valves for regulating the amount of air flow in both of said conduits.

5. A lubricating apparatus for pneumatic tools comprising a container having a lubricant supply chamber, a main air supply inlet in said container, a conduit in communication with said inlet and leading to said lubricant supply chamber, a plurality of outlets in communication with said inlet, a second conduit leading from said lubricant supply chamber to the point of communication of said inlet and of said outlets, and valves for regulating the amount of air flow in both of said conduits, and a check valve in said first-named conduit.

6. A lubricating apparatus for pneumatic tools comprising a container having a lubricant supply chamber and a moisture precipitating chamber, a main air supply inlet terminating in said moisture precipitating chamber, a conduit leading from said moisture precipitating chamber to said lubricant supply chamber, a plurality of outlets in communication with said inlet, a second conduit leading from said lubricant supply chamber to the point of communication of said inlet and of said outlets, valves for regulating the amount of air flow in both of said conduits, and a check valve in said first-named conduit.

7. A lubricant apparatus for pneumatic tools comprising a container having a lubricant supply chamber, a moisture precipitating chamber and a mixing chamber, a main air supply inlet terminating in said moisture precipitating chamber, a conduit leading from said moisture precipitating chamber to said lubricant supply chamber, a second conduit leading from said lubricant supply chamber to said mixing chamber, a plurality of outlets in said mixing chamber and a third conduit leading from said moisture precipitating chamber to said mixing chamber.

8. A lubricating apparatus for pneumatic tools comprising a container having a lubricant supply chamber, a moisture precipitating chamber and a mixing chamber, a main air supply inlet terminating in said moisture precipitating chamber, a conduit leading from said moisture precipitating chamber to said lubricant supply chamber, a second conduit leading from said lubricant supply chamber to said mixing chamber, a plurality of outlets in said mixing chamber and a third conduit leading from said moisture precipitating chamber to said mixing chamber, and flow regulating valves in said second and third conduits.

9. A lubricating apparatus for pneumatic tools comprising a container having a lubricant supply chamber and a moisture precipitating chamber, a main air supply inlet terminating in said moisture precipitating chamber, a conduit leading from said moisture precipitating chamber to said lubricant supply chamber, an outlet in communication with said inlet, and a second conduit leading from said lubricant supply chamber to a point of communication with said outlet.

10. A lubricating apparatus for pneumatic tools comprising a container having a lubricant supply chamber and a moisture precipitating chamber, a main air supply inlet terminating in said moisture precipitating chamber, a conduit leading from said moisture precipitating chamber to said lubricant supply chamber, and a second conduit leading from said lubricant supply chamber.

11. The combination of a lubricant container, a conduit having an opening for dividing the conduit into two portions, means for supplying air to said opening, one of said portions being provided with an opening disposed interiorly of said container below the level of said lubricant, a check valve interposed between said openings, a conduit opening in said container above the level of said lubricant and means for uniting said last-named conduit and the other of said portions.

CHARLES A. MEDSKER.